H. M. Johnston,
Lambrequin.
No. 98,974. Patented Jan. 18, 1870.
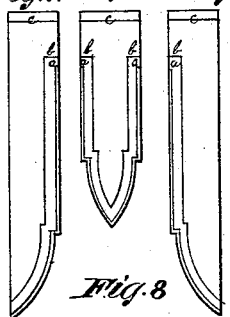
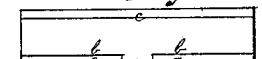
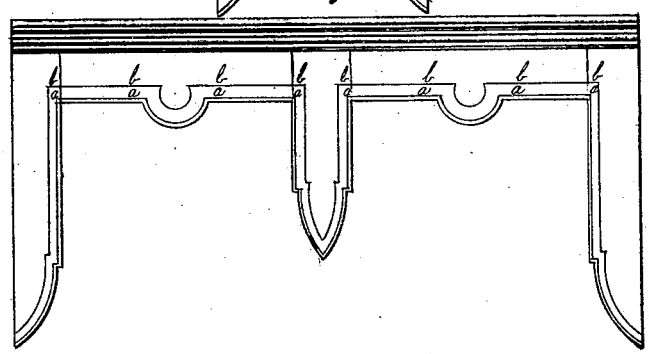
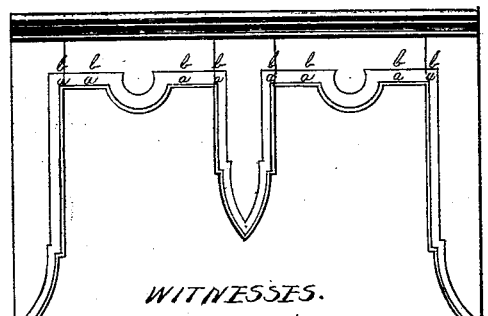
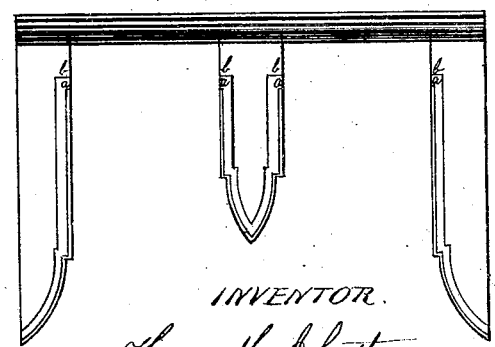
WITNESSES.
O. S. Follett
David Earle
INVENTOR.
Henry M. Johnston

United States Patent Office.

HENRY M. JOHNSTON, OF NEW YORK, N. Y.

Letters Patent No. 98,974, dated January 18, 1870.

---

IMPROVED LAMBREQUIN.

---

The Schedule referred to in these Letters Patent and making part of the same

---

*To all whom it may concern:*

Be it known that I, HENRY M. JOHNSTON, of the city, county, and State of New York, have invented a new and useful Improvement in Lambrequin; and I do hereby declare that the following is a full, clear, and exact description thereof, reference being had to the accompanying drawings, making part of this specification.

As lambrequins are now made, they are adaptable only to windows corresponding in size with those for which the lambrequins were made, and where it is required to adapt them to windows which are much larger or smaller, it is then necessary to incur the expense of employing an upholsterer to alter and fit them to such windows, which alteration cannot always be made without destroying the original design.

This invention has for its object the production of lambrequins, made in sections, which can be adjusted by any person to small or large windows, without expense, and without material change of design.

My invention is not confined to any special quality of lambrequins, but I regard it as more particularly applicable to those made of paper, or paper and cloth combined, or those made of common cloth, and where superfluous material is not too expensive.

To enable others skilled in the art to make and use my invention, I will proceed to describe the same, with reference to the drawings.

The drawings illustrate one style of my improved lambrequins, which is composed of five sections, Figures 1 and 2 of which represent right and left transverse sections, Figures 3 and 4 represent right and left vertical sections, and Figure 5, the centre vertical section.

When it is desired to adapt the lambrequin to a narrow window, then the right and left vertical sections, figs. 3 and 4, and the centre vertical section, fig. 5, are fastened in position, as shown in Figure 6; then the transverse sections, figs. 1 and 2, are fastened in position, so that part of each of the ends of these sections are concealed behind the vertical sections, 3, 4, and 5, as represented in Figure 7.

It will be readily understood, that to adapt the lambrequin to a wide window, it is only necessary to fasten the vertical sections, figs. 3, 4, and 5, a wide distance apart, and then to fasten the transverse sections, figs. 1 and 2, in position, in which case the greater part of the ends of these sections, which were concealed behind the vertical sections in fig. 7, will then be brought in view, as shown in Figure 8.

In adjusting the vertical and transverse sections in position, as shown in figs. 6, 7, and 8, the sections must be so placed that the lines of the decoration, *a* and *b*, figs. 1, 2, 3, 4, and 5, will come exactly in straight lines with each other, to effect which purpose, there are made, on the back of the sections, registered lines, corresponding with the lines *c*, figs. 1, 2, 3, 4, and 5, which registered lines are placed exactly in line with and against the straight edge of the cornice, by which means the lines *a* and *b* will come exactly in line with each other, as shown in figs. 7 and 8.

My invention extends to a great variety of lambrequins, in some of which, both the transverse and vertical sections are made up of separate parts or sections, parts of which sections are concealed behind the other parts, when the lambrequins are adjusted to small windows, and when adjusted to large windows, the concealed parts are then brought in view, by which means the lambrequins can be adjusted to very small or very large windows, without change of proportion in the design; therefore, I do not confine myself to any number of sections or design, the drawings being given to describe my invention by one style of lambrequin, not with a view of limitation of design, or number of sections, or any specified relative position in adjusting the sections, as the transverse or other sections may be placed in front of the vertical sections, and thereby accomplish the same purpose.

Having thus described my invention,

What I claim as new, and desire to secure by Letters Patent, is—

The construction of lambrequins in sections, which can be adjusted to windows of different sizes, in the manner specified.

HENRY M. JOHNSTON.

Witnesses:
   O. S. FOLLETT,
   DAVID EARLE.